(12) United States Patent
Kim

(10) Patent No.: US 6,373,820 B1
(45) Date of Patent: Apr. 16, 2002

(54) METHOD AND APPARATUS FOR MAINTENANCE AND REPAIR OF CAMA INTERFACE IN PCX SYSTEM

(75) Inventor: Young-Tae Kim, Gumi-shi (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/267,650

(22) Filed: Mar. 15, 1999

(30) Foreign Application Priority Data

Mar. 14, 1998 (KR) .............................. 98-8659

(51) Int. Cl.$^7$ .............................. H04Q 7/30; G06F 9/44
(52) U.S. Cl. ...................... 370/250; 455/67.1; 455/67.4; 455/560
(58) Field of Search ................................. 370/241, 244, 370/250, 242, 248, 246; 455/212, 412, 423, 422, 426, 432, 67.1, 67.4, 560, 424; 709/221, 242; 703/23

(56) References Cited

U.S. PATENT DOCUMENTS

| 5,434,798 A | * | 7/1995 | Madebrink et al. ......... 455/423 |
| 5,481,588 A | * | 1/1996 | Rickli et al. ............... 455/67.1 |
| 5,583,792 A | * | 12/1996 | Li et al. ...................... 370/253 |
| 5,748,617 A | | 5/1998 | McLain, Jr. et al. ......... 370/244 |
| 5,809,286 A | | 9/1998 | McLain, Jr. et al. ......... 370/250 |
| 5,839,064 A | | 11/1998 | Foti ............................ 455/413 |
| 5,867,689 A | | 2/1999 | McLain, Jr. ................. 370/244 |
| 5,878,115 A | | 3/1999 | Valentine et al. ........... 455/422 |

* cited by examiner

Primary Examiner—Alpus H. Hsu
Assistant Examiner—Afsan M. Qureshi
(74) Attorney, Agent, or Firm—Robert E. Bushnell, Esq.

(57) ABSTRACT

A method for maintaining and repairing a charging data transmit processor (CDTP) being an interface between a centralized automatic message accounting (CAMA) center and an mobile switching center (MSC) having an mobile switching center main processor status handler (MSC MPSH) for status handling and control of a processor thereof and a lower-level processor in a personal communication service exchange (PCX) system, includes the mobile switching center main processor status handler (MSC MPSH) periodically sending a status handling signal to the charging data transmit processor (CDTP) by interprocessor communication (IPC), determining whether the mobile switching center man processor status handler (MSC MPSH) receives a response signal from the charging data transmit processor (CDTP), and if the charging data transmit processor (CDTP) is determined to be abnormal, generating an alarm to the mobile switching center (MSC), and providing a message indicating the abnormality is output to the mobile switching center (MSC) if the mobile switching center main processor status handler (MSC MPSH) receives no response signal from the charging data transmit processor (CDTP).

19 Claims, 4 Drawing Sheets

METHOD AND APPARATUS FOR MAINTENANCE AND REPAIR OF CAMA INTERFACE IN PCX SYSTEM

CLAIM OF PRIORITY

This application makes reference to, incorporates the same herein, and claims all benefits accruing under 35 U.S.C. §119 from an application for MAINTENANCE AND REPAIR OF CAMA INTERFACE IN PCX SYSTEM earlier filed in the Korean Industrial Property Office on Mar. 14, 1998 and there duly assigned Ser. No. 8659/1998.

BACKGROUND OF THE INVENTION

1. Field of the Invention

The present invention relates to maintenance and repair of a processor being an interface between an mobile switching center (MSC) and other centers in a personal communication service exchange (PCX) system, and in particular, to a method of maintaining and repairing an interface between an mobile switching center (MSC) and a centralized automatic message accounting (CAMA) center in a personal communication service exchange (PCX) system in order to enable reliable communication and data transmission between the mobile switching center (MSC) and the centralized automatic message accounting (CAMA) center.

2. Description of the Related Art

A charging method employed in a mobile switching center (MSC) tends to shift from local automatic message accounting (LAMA) to centralized automatic message accounting (CAMA). In the former, charging data is periodically transferred by an operator, while in the latter, charging data files are periodically extracted from a mobile switching center (MSC) and automatically transmitted on-line to a collector in a centralized automatic message accounting (CAMA) center to thereby enable automatic and daily accounting.

The mobile switching center (MSC) offers the telecommunication management network (TMN) function of managing and processing various messages generated from the mobile switching center (MSC). The telecommunication management network (TMN) function is performed in a telecommunication management network (TMN) center separately procured and connected to the mobile switching center (MSC).

Both the centralized automatic message accounting (CAMA) and telecommunication management network (TMN) functions are performed in separately procured centers, and an interface is formed between the mobile switching center (MSC) and the centralized automatic message accounting (CAMA) and telecommunication management network (TMN) centers. This interface is a mediation device or a workstation called charging data transmit processor (CDTP) or telecommunication management network processor (TMNP). The mediation device receives charging data and statistics from a mobile switching center (MSC) and converts corresponding information in the form allowing analysis in the centralized automatic message accounting (CAMA) and telecommunication management network (TMN) centers, so that service quality can be increased.

However, possible abnormal operation of the charging data transmit processor (CDTP) or telecommunication management network processor (TMNP) can cause serious damage to the mobile switching center (MSC). Due to the resulting loss and errors of charging data, the centralized automatic message accounting (CAMA) or telecommunication management network (TMN) center cannot identify the correct status of the mobile switching center (MSC), thereby making it difficult to reliably operate the mobile switching center (MSC).

U.S. Pat. No. 5,434,798 to Madebrink et al., entitled RECONFIGURATION IN A CELLULAR COMMUNICATIONS NETWORK, discloses a method and apparatus for performing reconfiguration of a cellular network. It is disclosed that cell parameters of affected mobile switching centers in the network are copied to a database, and the copied parameters are stored. A set of proposed changes to the stored parameters are prepared and the consistency of the prepared set of proposed changes is verified. It is disclosed that any necessary alterations to the set of proposed changes responsive to the verification are made and the verified set of proposed changes are copied to the affected mobile switching centers, and the verified set of proposed changes are then introduced into the network. Additionally, at all times, an up-to-date image of all the cell parameters in all the mobile switching centers in the network is maintained in a system parameter database.

U.S. Pat. No. 5,748,617 to McLain Jr., entitled METHOD AND APPARATUS FOR EMULATING A DIGITAL CROSS-CONNECT SWITCH NETWORK, discloses a method and apparatus for emulating a digital cross-connect (DXC) network fully tests a telecommunication network monitoring and control system (MSC). The communication and behavior of a digital cross-connect switching network are disclosed to be emulated in the presence and absence of selected network configuration, failures, and/or normalizations. A communication module communicates with the MCS through emulator control links using a communications protocol substantially identical to a communications protocol used in the emulated digital cross-connect network. A configuration database is disclosed to store configuration data representing the current behavior of the DXC nodes, and a topology database is disclosed to store topology data representative of the topology of the emulated DXC network. An emulator message generator generates messages emulating communications from DXC nodes to the MCS. It is disclosed that an emulator link selector further selects an enabled emulator control link depending upon whether respective emulated network control links are enabled.

U.S. Pat. No. 5,809,286 to McLain Jr. et al., entitled METHOD AND APPARATUS FOR EMULATING A DYNAMICALLY CONFIGURED DIGITAL CROSS-CONNECT SWITCH NETWORK, discloses a method and apparatus for emulating a digital cross-connect switching (DXC) network, such as a DXC I/O network, fully tests a telecommunication network monitoring and control system (MCS). It is disclosed that the communication and behavior of a DXC network at the channel level are emulated in the presence and absence of selected network node and trunk configurations, failures, and/or normalizations. A communication module communicates with the MCS through emulator control links using a communications protocol substantially identical to a communications protocol used in the emulated digital cross-connected network. Configuration data is disclosed to represent the current behavior of the DXC nodes. Topology data is disclosed to trace logical trunks or channels through adjacent DXC nodes, and to further include port provision data identifying the allocation of channels for cross-connected ports at DXC nodes. It is also disclosed that additional DXC nodes and/or trunks can be added or deleted from the topology data during preprocessing or emulator operation to test different postulated network designs.

U.S. Pat. No. 5,839,064 to Foti, entitled SYSTEM AND METHOD OF DYNAMIC ALLOCATION OF REDUNDANT PERIPHERAL EQUIPMENT GATEWAYS IN A RADIO TELECOMMUNICATIONS NETWORK, discloses a radio telecommunications network for providing redundant interfaces from a mobile switching center (MSC) to an associated voice mail system (VMS). The radio telecommunications network is disclosed to include a first peripheral equipment gateway (PEG-1) connected to the VMS, wherein the PEG-1 provides a first interface between the VMS and the radio telecommunications network, and a second peripheral equipment gateway (PEG-2) connected to the VMS, wherein the PEG-2 provides a second interface between the VMS and the radio telecommunications network. It is disclosed that the MSC receives and routes an incoming call from a mobile station requesting voice mail retrieval, and a home location register (HLR) simultaneously sends routing request messages to PEG-1 and PEG-2, and includes an indication that the routing request messages are for voice mail retrieval. It is further disclosed that PEG-1 and PEG-2 return routing numbers for the VMS to the HLR. The HLR receives at least one routing number for the VMS, and the MSC delivers the incoming call to the VMS utilizing the first routing number received in the HLR.

U.S. Pat. No. 5,867,689 to McLain Jr., entitled METHOD AND APPARATUS FOR EMULATING A DIGITAL CROSS-CONNECT SWITCH NETWORK USING A FLEXIBLE TOPOLOGY TO TEST MCS NETWORK MANAGEMENT, discloses a method and apparatus for emulating a digital cross-connect switching (DXC) network fully tests a telecommunication network monitoring and control system (MCS). The communication and behavior of a DXC network are emulated in the presence and absence of selected network node and trunk configurations, failures, and/or normalizations. It is disclosed that a communication module communicates with the MCS through emulator control links using a communications protocol substantially identical to a communications protocol used in the emulated digital cross-connect network. A configuration database is disclosed to store configuration data representing the current behavior of the DXC nodes, and a topology database is disclosed to store flexible topology data identifying trunks through adjacent DXC nodes. Changes to trunk connections can be made without knowledge of intermediate site and equipment topology details to test many network scenarios. It is disclosed that an emulator message generator generates messages emulating communications from DXC nodes to the MCS. An emulator link selector further selects an enabled emulator control link depending upon whether respective emulated network control links are enabled.

U.S. Pat. No. 5,878,115 to Valentine et al., entitled METHOD AND APPARATUS FOR PROVIDING DIFFERENT TERMINATING CALL TREATMENTS BASED ON SERVICE AREA, discloses a routing address representing an alternative terminal assigned to a particular service area. Such a service area comprises a local access and transport area (LATA), mobile switching center (MSC) area, location area, and cell area. It is disclosed that whenever an incoming call is received towards a mobile station currently located within the particular service area, instated of transmitting a routing address representing the mobile station, the service mobile switching center (MSC) transmits a signal containing the routing address representing the alternative terminal. Instead of routing the call to the intended mobile station, the gateway mobile switching center (GMSC) is disclosed to utilize the received routing address and reroutes the incoming call to the alternative terminal. It is also disclosed that by rerouting all incoming calls towards the alternative terminal in case of an emergency, all available access channels are reserved for making outgoing calls by the mobile subscribers located within the emergency service area.

SUMMARY OF THE INVENTION

Therefore, an object of the present invention is to provide a method of maintaining and repairing an interface between an mobile switching center (MSC) and a centralized automatic message accounting (CAMA) center in a personal communication service exchange (PCX) system in order to enable reliable communication and data transmission between the mobile switching center (MSC) and the centralized automatic message accounting (CAMA) center by detecting a possible problem involved in charging data transmission from the mobile switching center (MSC) to a charging data transmit processor (CDTP) in an early stage and taking rapid measures against the problem.

To achieve the above object, there is provided a method of maintaining and repairing a charging data transmit processor (CDTP) being an interface between a centralized automatic message accounting (CAMA) center and a mobile switching center (MSC) having a mobile switching center main processor status handler (MSC MPSH) for status handling and control of a processor thereof and a lower-level processor in a personal communication service exchange (PCX) system. In the method, the mobile switching center main processor status handler (MSC MPSH) periodically sends a status handling signal to the charging data transmit processor (CDTP) by interprocessor communication (IPC), and it is determined whether the mobile switching center main processor status handler (MSC MPSH) receives a response signal from the charging data transmit processor (CDTP). If the charging data transmit processor (CDTP) is determined to be abnormal, an alarm is generated to the mobile switching center (MSC), and a message indicating an abnormality is output to the mobile switching center (MSC) if the mobile switching center main processor status handler (MSC MPSH) receives no response signal from the charging data transmit processor (CDTP).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
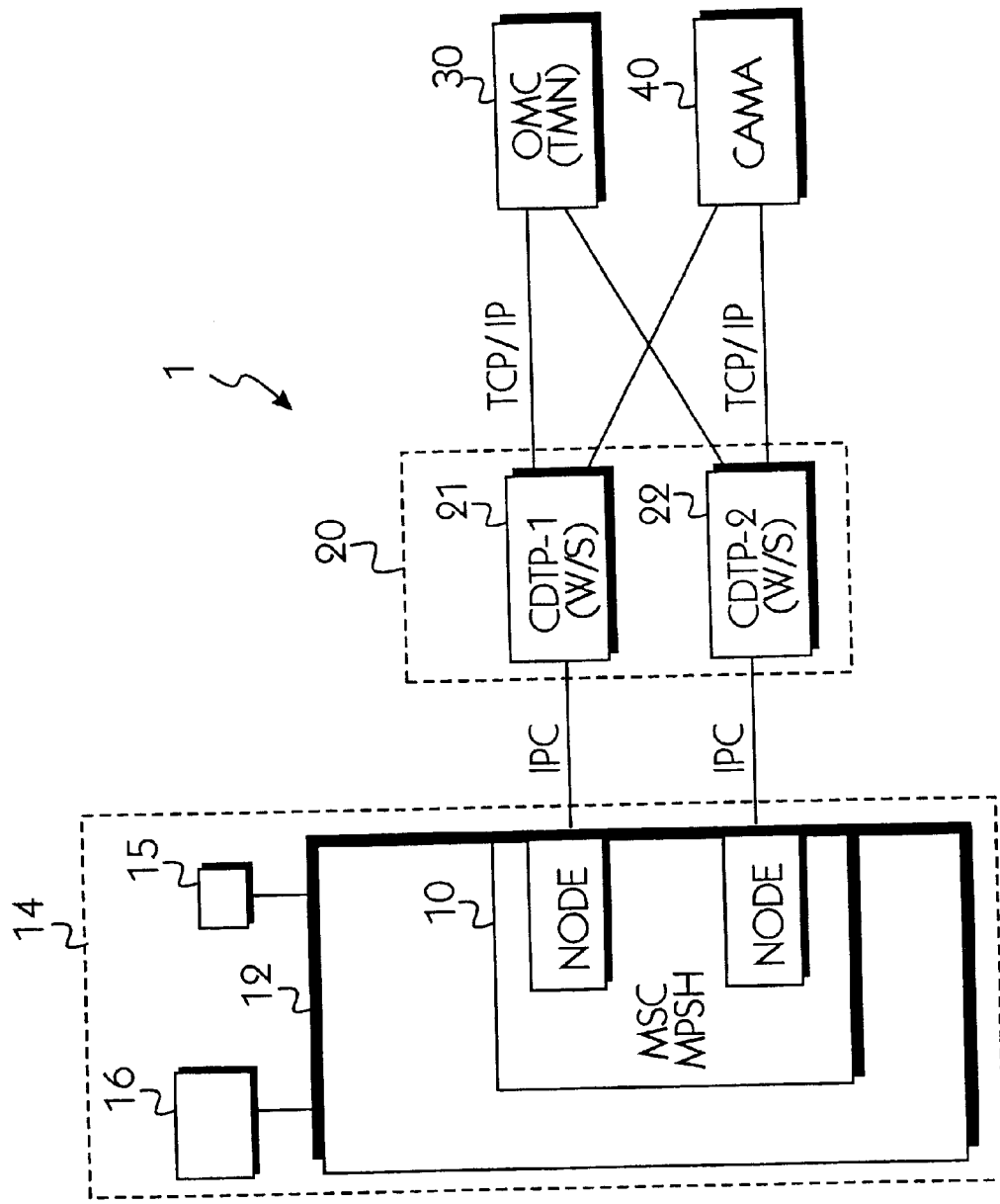
FIG. 1 is a block diagram of a personal communication service exchange (PCX) system according to the present invention.

Referring to FIG. 1, a personal communication service exchange (PCX) system 1 according to the present invention is illustrated. A mobile switching center main processor status handler (MSC MPSH) 10 is included in an upper-level processor 12 of a mobile switching center (MSC) 14, for managing and controlling the statuses of the processor 12 and a lower-level processor. In the case of a peripheral processor, the mobile switching center main processor status handler (MSC MPSH) periodically manages the peripheral processor and detects its abnormality through answer-back in cooperation with a status manager in the peripheral processor. Upon a detection of a hardware abnormality, the mobile switching center main processor status handler (MSC MPSH) gives an alarm, such as by alarm 15, while it transmits an alarm message to a mobile switching center (MSC) console 16 in a software abnormality.

A charging data transmit processor (CDTP) 20 is a workstation (W/S) being a dual peripheral processor, such as a dual charging transmit processor (d-CDTP) and includes a charging data transmit processor (CDTP)-1 21, and a charging data transit processor (CDTP)-2 22. The charging data transmit processor (CDTP) 20 acts as an interface between the mobile switching center main processor status handler (MSC MPSH) 10 and a centralized automatic message accounting (CAMA) center 40 and between the mobile switching center main processor status handler (MSC MPSH) 10 and a telecommunication management network (TMN) center (i.e., OMC: operating and management center) 30, for converting various data generated from the mobile switching center main processor status handler (MSC MPSH) 10 in the form of messages recognizable in the centralized automatic message accounting (CAMA) center 40 and the telecommunication management network (TMN) center 30. According to a feature of the present invention, the charging data transmit processor (CDTP) 20 provides the function of managing and repairing the communication status between the charging data transmit processor (CDTP) 20 and the mobile switching center main processor status handler (MSC MPSH) 10. For this purpose, status handling signals are periodically communicated between the mobile switching center main processor status handler (MSC MPSH) 10 and the charging data transmit processor (CDTP) 20 by interprocessor communication (IPC). Because the charging data transmit processor (CDTP) 20 is a dual peripheral processor, either of the charging data transmit processor (CDTP)-1 21 and charging data transmit processor (CDTP)-2 22 is active and the other stands by.

The centralized automatic message accounting (CAMA) center 40 and the telecommunication management network (TMN) center 30 manage and process charging data and various messages generated from the mobile switching center main processor status handler (MSC MPSH) 10 through the charging data transmit processor (CDTP) 20.

Now, there will be given a description of a method of managing the communication status between the mobile switching center main processor status handler (MSC MPSH) 10 and the charging data transmit processor (CDTP) 20 according to the present invention.

Referring to FIG. 1, the mobile switching center main processor status handler (MSC MPSH) 10 transmits a signal periodically to the charging data transmit processor (CDTP) 20 by interprocessor communication (IPC). Upon reception of the signal, the charging data transmit processor (CDTP) 20 sends a response signal to the mobile switching center main processor status handler (MSC MPSH) 10. When a failure is detected in the charging data transmit processor (CDTP) 20 by a self-test, the charging data transmit processor (CDTP) 20 sends a predetermined signal to the mobile switching center main processor status handler (MSC MPSH) 10. Then, the mobile switching center main processor status handler (MSC MPSH) 10 analyses the signal, generates an alarm, such as by alarm 15, and outputs a corresponding message, such as to console 16. If the charging data transmit processor (CDTP) 20 fails to send a response signal to the signal periodically transmitted from the mobile switching center main processor status handler (MSC MPSH) 10, the mobile switching center main processor status handler (MSC MPSH) 10 determines a corresponding charging data transmit processor (CDTP) of charging data transmit processor (CDTP) 20 to be abnormal, and outputs a message indicating the abnormality, such as to console 16. This procedure is performed by mutual operation of programs in the mobile switching center main processor status handler (MSC MPSH) 10 and the charging data transmit processor (CDTP) 20.

Figure 2:
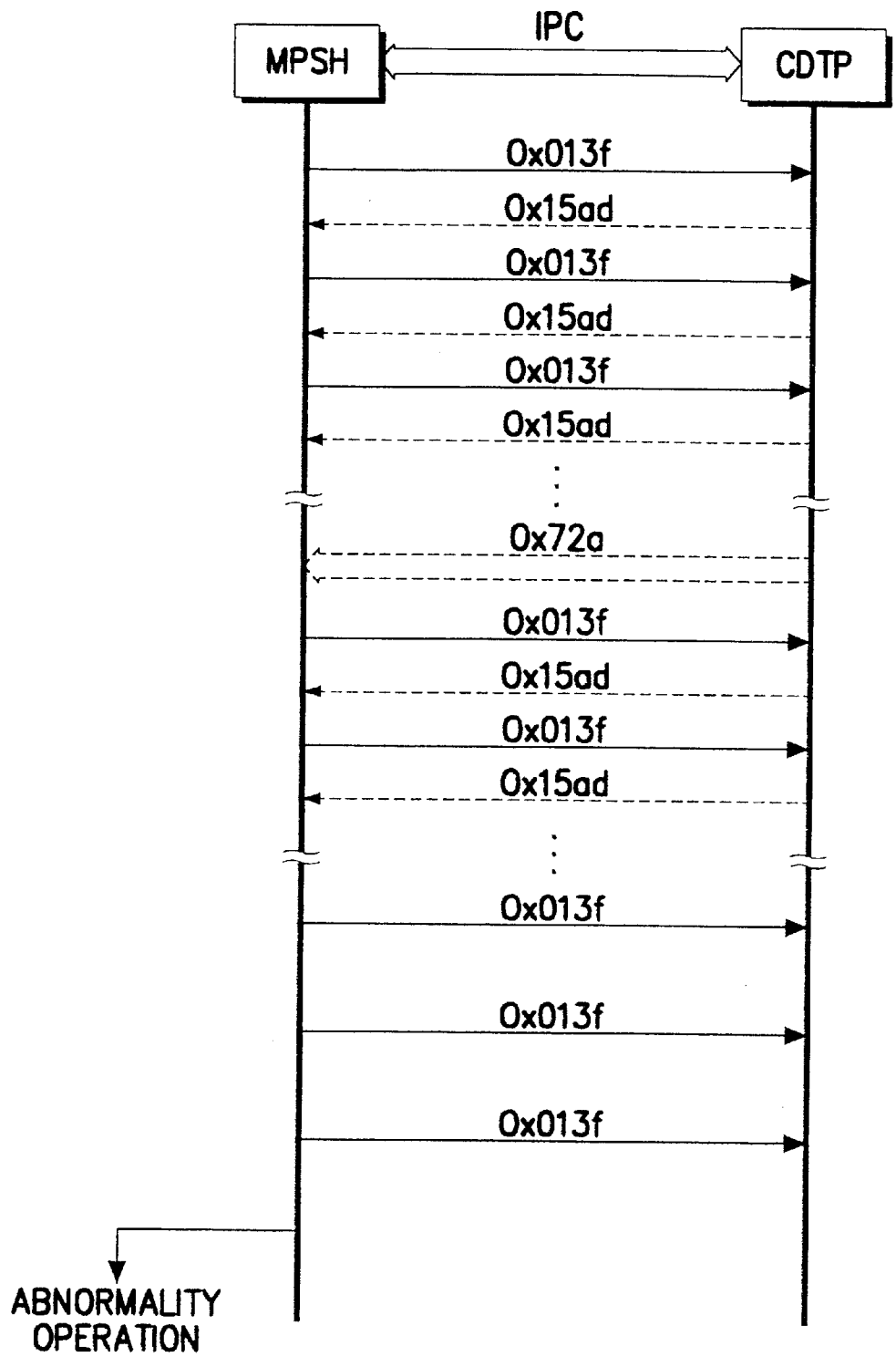
FIG. 2 illustrates communication signals exchanged between a mobile switching center (MSC) and a centralized automatic message accounting (CAMA) interface by interprocessor communication (IPC)

FIG. 2 is a view illustrating communication signals exchanged between the mobile switching center main processor status handler (MSC MPSH) 10 and the charging data transmit processor (CDTP) 20, charging data transmit processor (CDTP) 20 being a centralized automatic message accounting (CAMA) interface by interprocessor communication (IPC) according to the present invention.

Referring first to FIGS. 1 and 2, the mobile switching center main processor status handler (MSC MPSH) 10 sends a sensing signed for example, 0x013f to the charging data transmit processor (CDTP)-1 21 and the charging data transmit processor (CDTP)-2 22 every three minutes. Upon reception of the signal, each charging data transmit processor (CDTP)-1 21 and (CDTP)-2 22, sends a response signal 0x15ad including its own interprocessor communication (IPC) address to the mobile switching center main processor status handler (MSC MPSH) 10.

Each charging data transmit processor, (CDTP)-1 21 and (CDTP)-2 22, sends a signal 0x72a indicating a status change to the mobile switching center main processor status handler (MSC MPSH) 10 whenever the corresponding charging data transmit processor (CDTP)-1 21 or (CDTP)-2 22 is driven or becomes active. Then, the mobile switching center main processor status handler (MSC MPSH) 10 communicates with the charging data transmit processor (CDTP) 20 by the signals 0x013f and 0x15d.

If a charging data transmit processor (CDTP)-1 21 or (CDTP)-2 22 fails to send a response signal to the signal 0x013f a predetermined number of times, the mobile switching center main processor status handler (MSC MPSH) 10 performs an abnormality operation on the corresponding charging data transmit processor (CDTP) of charging data transmit processor (CDTP) 20.

Figure 3:
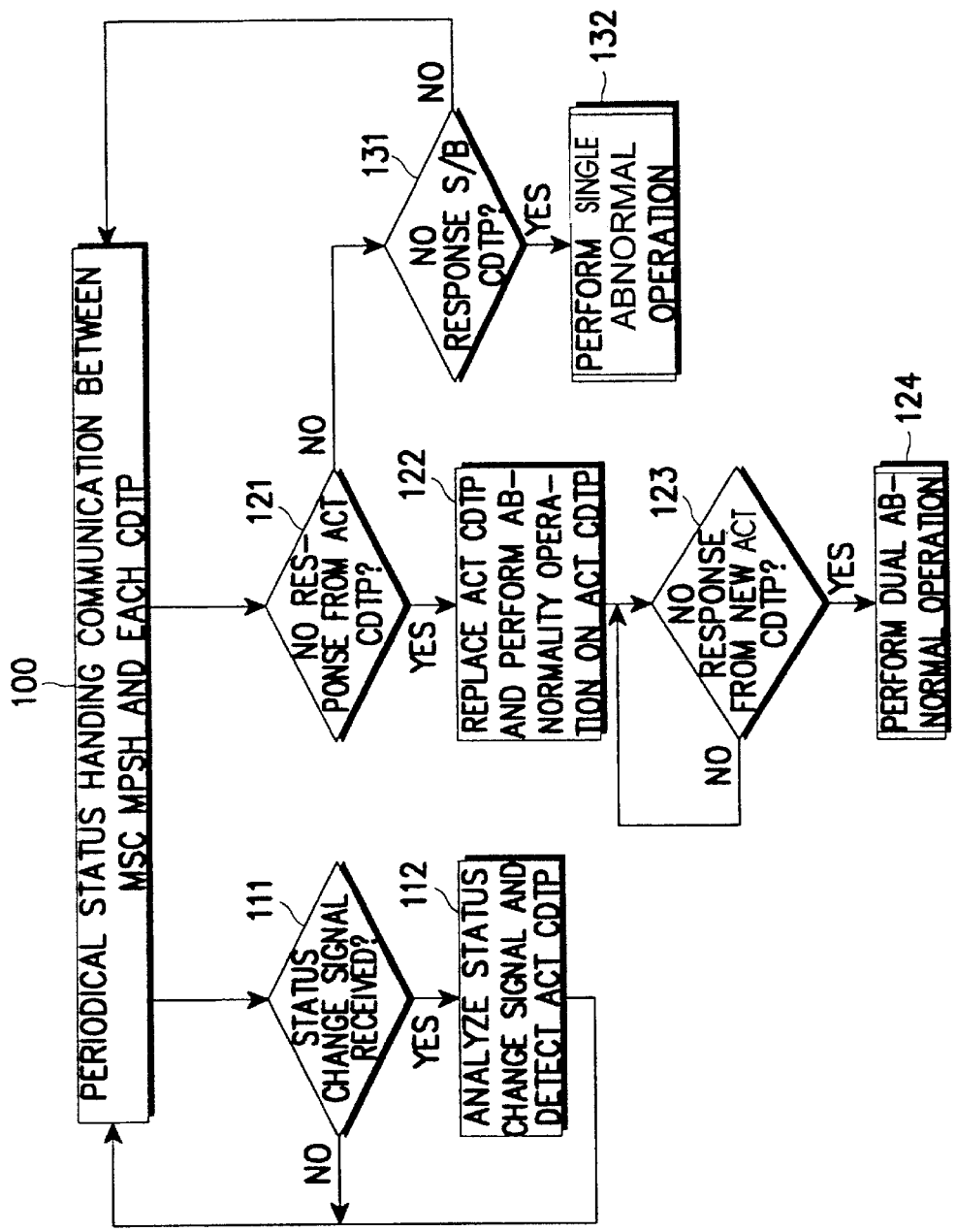
FIG. 3 is a flowchart of management and abnormality processing of the centralized automatic message accounting (CAMA) interface between the mobile switching center (MSC) and the centralized automatic message accounting (CAMA) interface by interprocessor communication (IPC) according to the present invention.

FIG. 3 is a flowchart of status handling and abnormality processing of the centralized automatic message accounting (CAMA) interface charging data transmit processor (CDTP) 20 by interprocessor communication (IPC) between the mobile switching center main processor status handler (MSC MPSH) 10 and the centralized automatic message accounting (CAMA) interface charging data transmit processor (CDTP) 20 according to the present invention.

Referring to FIGS. 1–3, particularly to FIG. 3, steps 100 to 132 proceed according to the control flow of the mobile switching center main processor status handler (MSC MPSH) 10 and according to the control flow of the charging data transmit processor (CDTP) 20 as indicated in the flowchart of FIG. 3.

In the flowchart of FIG. 3, in step 100, the mobile switching center main processor status handler (MSC MPSH) 10 periodically exchanges communication signals with the charging data transmit processor (CDTP)-1 21 and the charging data transmit processor (CDTP)-2 22 for status handling when the charging data transmit processor (CDTP)-1 21 and the charging data transmit processor (CDTP)-2 22 are in a normal state. That is, the mobile switching center main processor status handler (MSC MPSH) 10 sends the sensing signal 0x013f of FIG. 2 to the charging data transmit processor (CDTP)-1 21 and the charging data transmit processor (CDTP)-2 22 every three minutes, for example. Upon reception of the sensing signal each charging data transmit processor, (CDTP)-1 21 and (CDTP)-2 22, sends the response signal 0x15ad of FIG. 2 including its own interprocessor communication (IPC) address to the mobile switching center main processor status handler (MSC MPSH) 10. This communication is periodically performed for communication status handling between the mobile switching center main processor status handler (MSC MPSH) 10 and the charging data transmit processor (CDTP) 20.

If the mobile switching center main processor status handler (MSC MPSH) 10 receives the status change signal 0x72a of FIG. 2 from a charging data transmit processor (CDTP)-1 21 or (CDTP)-2 22 in step 111 during the status handling communication in step 100, the mobile switching center main processor status handler (MSC MPSH) 10 analyses the status change signal, perceives or recognizes that a charging data transmit processor (CDTP)-1 21 or (CDTP)-2 22 is driven or becomes active, and detects an active charging data transmit processor (ACT CDTP) from the response signal 0x15ad of FIG. 2 received from both charging data transmit processor (CDTP)s in step 112. Then, the procedure returns to step 100.

Meanwhile, the charging data transmit processor (CDTP) 20 can operate in an abnormal state. In the present invention, the abnormal state of one charging data transmit processor (CDTP) is called a single abnormal state, whereas the abnormal state of both charging data transmit processors (CDTP)s is called a dual abnormal state.

Continuing with reference to FIGS. 1–3, steps 121 to 124, 131, and 132 depict the operation of the mobile switching center main processor status handler (MSC MPSH) 10 when the charging data transmit processor (CDTP) 20 is in an abnormal state. Charging data transmit processor (CDTP) abnormalities can include absence or failure of a board built in a charging data transmit processor (CDTP), misoperation of the charging data transmit processor (CDTP), and a defect in a link cable between the mobile switching center (MSC) and the charging data transmit processor (CDTP).

If the charging data transmit processor (CDTP) 20 sends no response signal during a normal status handling communication between the mobile switching center main processor status handler (MSC MPSH) 10 and the charging data transmit processor (CDTP) 20 in step 100, the procedure goes to steps 121. When an active charging data transmit processor (ACT CDTP), (CDTP)-21-1 or (CDTP)-22-2, sends no response signal 0x15ad of FIG. 2 to the sensing signal 0x013f of FIG. 2 to the mobile switching center main processor status handler (MSC MPSH) 10, the procedure goes to step 121. If the mobile switching center main processor status handler (MSC MPSH) 10 receives no response signal from the active charging data transmit processor (ACT CDTP) after it sends the signal 0x013f a predetermined number of times, it is determined that the active charging data transmit processor (ACT CDTP) fails to respond. In the embodiment of the present invention, the predetermined number of times is three times, for example.

If the active charging data transmit processor (ACT CDTP) fails to respond in step 121, the procedure goes to step 122, where the mobile switching center main processor status handler (MSC MPSH) 10 replaces the active charging data transmit processor (ACT CDTP), (CDTP)-21-1 or (CDTP)-22-2, with the other charging data transmit processor (CDTP), the other of (CDTP)-21-1 or (CDTP)-22-2, and the identification (ID) of the active charging data transmit processor (ACT CDTP) with that of the substitute charging data transmit processor (CDTP), and then waits for a response signal from the new active charging data transmit processor (ACT CDTP). Here, a single is abnormal operation is performed on the charging data transmit processor (CDTP) that sends no response signal. That is, the mobile switching center main processor status handler (MSC MPSH) 10 outputs a single abnormal message, for example, a single down alarm to alarm 15 or to the console 16 of the mobile switching center (MSC) 14.

Proceeding to step 123, the mobile switching center main processor status handler (MSC MPSH) 10 determines whether the new active charging data transmit processor (ACT CDTP) sends no response signal during the status handling communication. If the new active charging data transmit processor (ACT CDTP) fails to send a response signal. The procedure goes to step 124 where the mobile switching center main processor status handler (MSC MPSH) 10 performs a dual abnormal operation, updates related data, and outputs a dual abnormal message, for example, a dual down alarm to alarm 15 or to the console 16 of the mobile switching center (MSC) 14.

If it is determined at step 121 the active charging data transmit processor (ACT CDTP) sends a response signal, the procedure goes to step 131 where it is determined if a stand-by charging data transmit processor (S/B CDTP) fails to send a response signal during the status handling communication in step 100. If the mobile switching center main processor status handler (MSC MPSH) 10 receives no response signal from the stand-by charging data transmit processor (S/B CDTP), the other of (CDTP)-21-2 or (CDTP)-22-2, the procedure goes to step 132 where the mobile switching center main processor status handler (MSC MPSH) 10 performs the single abnormal operation on the stand-by charging data transmit processor (S/B CDTP) and outputs a single abnormal message, for example, a single down alarm to alarm 15 or to console 16 of the mobile switching center (MSC) 14.

Therefore, in the present invention, when a charging data transmit processor (CDTP), (CDTP)-21-1 or (CDTP)-22-2, sends no response signal to a message periodically issued from the mobile switching center main processor status handler (MSC MPSH) 10 within a predetermined time, for example, 30 seconds, the mobile switching center main processor status handler (MSC MPSH) 10 can determine the charging data transmit processor (CDTP) as abnormal and output a related message to console 16 or output an alarm to alarm 15 of mobile switching center (MSC) 14, for example.

Figure 4:
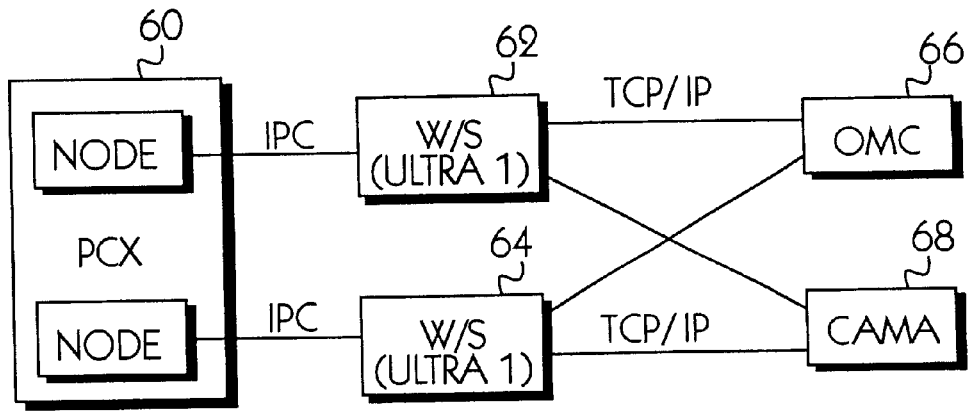
FIG. 4 is a block diagram of a personal communication service exchange (PCX) system of Hansol, Korea, to which the present invention is applicable.
Figure 5:
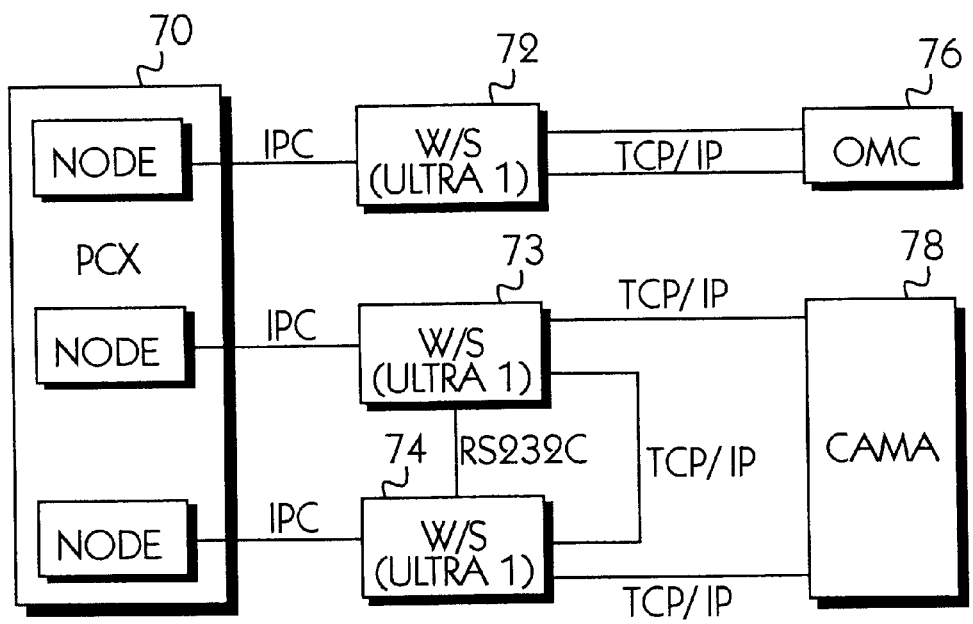
FIG. 5 is a block diagram of a personal communication service exchange (PCX) system of Korea Telecom, to which the present invention is applicable.

FIGS. 4 and 5 illustrate personal communication service exchange (PCX) systems of Hansol, Korea, and Korea Telecom, respectively, to which the present invention can be applied. Referring to FIG. 4, FIG. 4 illustrates personal communication service exchange (PCX) 60 which can include an upper level processor for managing a peripheral processor, such as the work station W/S (ULTRA-1) 62 and the work station W/S (ULTRA-1) 64, the work stations W/S (ULTRA-1) 62 and W/S (ULTRA-1) 64 communicating with the personal communication service exchange (PCX) 60 through inter processor communication (IPC). The work stations W/S (ULTRA-1) 62 and W/S (ULTRA-1) 64 act as an interface between the personal communication service exchange (PCX) 60 and a operating and management center (OMC) 66 and between the personal communication service exchange (PCX) 60 and a centralized automatic message accounting (CAMA) center 68, for converting various data generated from the personal communication service exchange (PCX) 60 in a form of messages recognizable in the operating and management center (OMC) 66 and the centralized automatic message accounting (CAMA) center 68.

FIG. 5 includes a personal communication service exchange (PCX) 70 which includes an upper-level processor for managing a peripheral processors, such as work stations W/S (ULTRA-1) 72 and W/S (ULTRA-1) 73, and W/S (ULTRA-1) 74. Communication between the personal communication service exchange (PCX) 70 and the workstations W/S (ULTRA-1) 72, W/S (ULTRA-1) 73 and W/S (ULTRA-1) 74 is by interprocessor communication (IPC). W/S (ULTRA-1) 72 acts as an interface between the personal communication service exchange (PCX) 70 and operating and management center (OMC) 76 for converting various data generated from the personal communication service exchange (PCX) 70 into the form of messages recognizable in the operating and management center (OMC) 76. Similarly, W/S (ULTRA-1) 73 and W/S (ULTRA-1) 74 act as an interface between the personal communication service exchange (PCX) 70 and the centralized automatic message accounting (CAMA) center 78 for converting various data generated from the personal communication service exchange (PCX) 70 in the form of messages recognizable in the centralized automatic message accounting (CAMA) center 78. The present invention can be applied to the personal communication service exchange (PCX) systems of FIGS. 4 and 5 in a similar manner as discussed above with respect to FIGS. 1–3.

As described above, the present invention is advantageous in that measures can rapidly be taken against a possible abnormality of an mobile switching center (MSC) through generation of a rapid alarm. Thus, the reliability of the mobile switching center (MSC) and service quality can be increased by providing the function of managing and repairing an interface between the mobile switching center (MSC) and other centers.

In addition, it is expected that the centralized automatic message accounting (CAMA) and telecommunication management network (TMN) functions will be applied to domestic and export mobile switching center (MSC) products in the future, and reinforcement of the mobile switching center (MSC) maintenance and repair function will contribute to an increase in the performance of the mobile switching centers (MSCs).

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modification may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method of maintaining and repairing a charging data transmit processor (CDTP) in a personal communication service exchange (PCX) system, comprising the steps of:

providing a personal communication service exchange (PCX) system;

providing a mobile switching center (MSC) in said personal communication service exchange (PCX) system, said mobile switching center (MSC) having a mobile switching center main processor status handler (MSC MPSH) for status handling and control of a processor of the mobile switching center (MSC) and a lower lever processor in the personal communication service exchange (PCX) system;

providing a charging data transmit processor (CDTP), said charging data transmit processor (CDTP) being an interface between the mobile switching center (MSC) and a centralized automatic message accounting (CAMA) center in the personal communication service exchange (PCX) system;

sending periodically by the mobile switching center main processor status handler (MSC MPSH) a status handling signal to the charging data transmit processor (CDTP) by interprocessor communication (IPC);

determining whether the mobile switching center main processor status handler (MSC MPSH) receives a response signal from the charging data transmit processor (CDTP) in response to the status handling signal;

determining if the charging data transmit processor (CDTP) is in an abnormal state, the charging data transmit processor (CDTP) being in the abnormal state if the mobile switching center main processor status handler (MSC MPSH) does not receive the response signal from the charging data transmit processor (CDTP); and generating at least one of an alarm and outputting a message indicating the abnormal state of the charging data transmit processor (CDTP) to the mobile switching center (MSC), if it is determined that the charging data transmit processor (CDTP) is in the abnormal state.

2. The method as claimed in claim 1, wherein the charging data transmit processor (CDTP) is a dual processor comprising an active charging data transmit processor (ACT CDTP) and a stand-by charging data transmit processor (S/B CDTP).

3. The method as claimed in clam 2, wherein the mobile switching center main processor status handler (MSC MPSH) determines a status of each of the active charging data transmit processor (ACT CDTP) and the stand-by charging data transmit processor (S/B CDTP) by periodical communication within each of the active charging data transmit processor (ACT CDTP) and the stand-by charging data transmit processor (S/B CDTP).

4. The method as claimed in claim 1, further comprising the step of sending by the charging data transmit processor (CDTP) a predetermined signal to the mobile switching center main processor status handler (MSC MPSH) if a failure is detected in the charging data transmit processor (CDTP) by a self-test.

5. The method as claimed in claim 4, further comprising the step of generating by the mobile switching center main processor status handler (MSC MPSH) at least one of an alarm and corresponding message to the mobile switching center (MSC), if the mobile switching center main processor status handler (MSC MPSH) receives a signal from the charging data transmit processor (CDTP) indicating the failure is detected in the self-test of the charging data transmit processor (CDTP).

6. A method of maintaining and repairing a dual charging data transmit processor (d-CDTP) in a personal communication service exchange (PCX) system, comprising the steps of:

providing a personal communication service exchange (PCX) system;

providing a mobile switching center (MSC) in the personal communication service exchange (PCX) system, the mobile switching center (MSC) having a mobile switching center main processor status handler (MSC MPSH) for status handling and control of a processor in the personal communication service exchange (PCX) system;

providing a dual charging data transmit processor (d-CDTP), the dual charging data transmit processor (d-CDTP) being an interface between the mobile switching center (MSC) and at least one of a centralized automatic message accounting (CAMA) center and a telecommunication management network (TMN) center in the personal communication service exchange (PCX) system;

sending periodically by the mobile switching center main processor status handler (MSC MPSH) a status handling signal to each charging data transmit processor (CDTP) in the dual charging data transmit processor (d-CDTP) by an interprocessor communication (IPC);

determining whether the mobile switching center main processor status handler (MSC MPSH) receives a response signal from each charging data transmit processor (CDTP) of the dual charging data transmit processor (d-CDTP) in response to the status handling signal sent to each charging data transmit processor (CDTP);

determining a charging data transmit processor (CDTP) of the dual charging data transmit processor (d-CDTP) as being in a normal state, if the mobile switching center main processor status handler (MSC MPSH) receives the response signal from the corresponding charging data transmit processor (CDTP) of the dual charging data transmit processor (d-CDTP), and determining a charging data transmit processor (CDTP) of the dual charging data transmit processor (d-CDTP) as being in an abnormal state if the mobile switching center main processor status handler (MSC MPSH) does not receive the response signal from the corresponding charging data transmit processor (CDTP) of the dual charging data transmit processor (d-CDTP);

performing a single abnormal operation if one charging data transmit processor (CDTP) of the dual charging data transmit processor (d-CDTP) is in an abnormal state by generating at least one of an alarm and an alarm message indicating the abnormal state of a corresponding charging data transmit processor (CDTP) to the mobile switching center (MSC);

performing a dual abnormal operation if each charging data transmit processor (CDTP) of the dual charging data transmit processor (d-CDTP) is in the abnormal state by generating at least one of an alarm and outputting an alarm message indicating the abnormality of both charging data transmit processors(CDTPs) of the dual charging data transmit processor (d-CDTP) to the mobile switching center (MSC).

7. The method as claimed in claim 6, further comprising the step of causing the dual charging data transmit processor (d-CDTP) to send a status change signal to the mobile switching center main processor status handler (MSC MPSH) if one of an active status and a stand-by status of at least one charging data transmit processor (CDTP) of the dual charging data transmit processor (d-CDTP) is changed.

8. The method as claimed in claim 7, further comprising the step of causing the mobile switching center main processor status handler (MSC MPSH) to recognize a changed status of at least one of charging data transmit processor (CDTP) of the dual charging data transmit processor (d-CDTP) when the mobile switching center main processor status handler (MSC MPSH) receives the status change signal from at least one charging data transmit processor (CDTP) of the dual charging data transmit processor (d-CDTP).

9. The method as claimed in claim 6, further comprising the step of causing the dual charging data transmit processor (d-CDTP) to send a predetermined signal to the mobile switching center main processor status handler (MSC MPSH) if a failure is detected in the dual charging data transmit processor (d-CDTP) by a self-test of the dual charging data transmit processor (CDTP).

10. The method as claimed in claim 9, further comprising the step of generating by the mobile switching center main processor status handler (MSC MPSH) at least one of an alarm and a corresponding message to the mobile switching center (MSC), if the mobile switching center main processor status handler (MSC MPSH) receives the predetermined signal indicating the failure detected in the self-test from the dual charging data transmit processor (d-CDTP).

11. A method of maintaining and repairing a dual charging data transmit processor (d-CDTP) in a personal communication service exchange (PCX) system, comprising the steps of:

providing a personal communication service exchange (PCX) system;

providing a mobile switching center (MSC) in the personal communication service exchange (PCX) system, the mobile switching center (MSC) including a mobile switching center main processor status handler (MSC MPSH) for status handing and control of a processor in the personal communication service exchange (PCX) system;

providing a dual charging data transmit processor (d-CDTP) in the personal communication service exchange (PCX) system, the dual charging data transmit processor (d-CDTP) including an active charging data transmit processor (ACT CDTP) and a stand-by charging data transmit processor (S/B CDTP), the dual charging data transmit processor (d-CDTP) providing an interface with the mobile switching center (MSC) and at least one of a centralized automatic message accounting (CAMA) center and a telecommunication management network (TMN) center in the personal communication service exchange (PCX) system;

periodically sending by the mobile switching center main processor status handler (MSC MPSH) a sensing signal to the active charging data transmit processor (ACT CDTP) and stand-by charging data transmit processor (S/B CDTP) of the dual charging data transmit processor (d-CDTP) by interprocessor communication (IPC);

determining if the active charging data transmit processor (ATC CDTP) and the stand-by charging data transmit processor (S/B CDTP) each respectively sends a response signal to the mobile switching center main processor status handler (MSC MPSH) after receiving the sensing signal from the mobile switching center main processor status handler (MSC MPSH);)

continuing periodically sending by the mobile switching center main processor status handler (MSC MPSH) the sensing signal to the active charging data transmit processor (ACT CDTP) and the stand-by charging data transmit processor (S/B CDTP) of the dual charging data transmit processor (d-CDTP) if the mobile switching center main processor status handler (MSC MPSH) continues to receive a corresponding response signal from each of the active charging data transmit processor (ACT CDTP) and the stand-by charging data transmit processor (S/B CDTP) of the dual charging data transmit processor (d-CDTP) in response to each sensing signal respectively periodically sent by the mobile switching center main processor status handler (MSC MPSH);

generating at least one of an alarm and an alarm message to the mobile switching center (MSC) indicating an abnormal state of the active charging data transmit processor (ACT CDTP) if the mobile switching center main processor status handler (MSC MPSH) does not receive a corresponding response signal from the active charging data transmit processor (ACT CDTP) for a predetermined time during the step of continually periodically sending by the mobile switching center main processor status handler (MSC MPSH) the sensing signal;

setting the stand-by charging data transmit processor (S/B CDTP) to an active mode, if the mobile switching center main processor status handler (MSC MPSH) does not receive a response signal from the active charging data transmit processor (ACT CDTP) for the predetermined time;

periodically performing communication between the mobile switching center main processor status handler (MSC MPSH) and the stand-by charging data transmit processor (S/B CDTP) set to the active mode, if the stand-by charging data transmit processor (S/B CDTP) is set to the active mode, the communication including periodically sending the sensing signal from the mobile switching center main processor status handler (MSC MPSH) to the stand-by charging data transmit processor (S/B CDTP) set to the active mode; and generating at least one of an alarm and an alarm message to the mobile switching center (MSC) indicating an abnormal state of both the active charging data transmit processor (ACT CDTP) and the stand-by charging data transmit processor (S/B CDTP) set to the active mode, if the mobile switching center main processor status handler (MSC MPSH) does not receive a response signal from the stand-by charging data transmit processor (S/B CDTP) set to the active mode during the step of periodically performing communication between the mobile switching center main processor status handler (MSC MPSH) and the stand-by charging data transmit processor (S/B CDTP) set to the active mode.

12. The method as claimed in claim 11, further comprising the steps of causing the mobile switching center main processor status handler (MSC MPSH) to determine the stand-by charging data transmit processor (S/B CDTP) as in the abnormal state if the mobile switching center main processor status handler (MSC MPSH) does not receive the response signal from the stand-by charging data transmit processor (S/B CDTP), and performing a communication between the mobile switching center main processor status handler (MSC MPSH) and the active charging data transmit processor (ACT CDTP) for communication status handling, the communication including periodically sending by the mobile switching center main processor status handler (MSC MPSH) the sensing signal to the active charging data transmit processor (ACT CDTP).

13. The method as claimed in claim 11, further comprising the steps of causing the mobile switching center main processor status handler (MSC MPSH) to recognize that a status of a charging data transmit processor (CDTP) of the dual charging data transmit processor (d-CDTP) is changed and detecting a charging data transmit processor (CDTP) of the dual charging data transmit processor (d-CDTP) in the active mode by checking the response signal received from each charging data transmit processor (CDTP) when the mobile switching center main processor status handler (MSC MPSH) receives a status change signal from a charging data transmit processor (CDTP) of the dual charging data transmit processor (d-CDTP).

14. The method as claimed in claim 11, further comprising the step of causing the dual charging data transmit processor (d-CDTP) to send a predetermined signal to the mobile switching center main processor status handler (MSC MPSH) if a failure is detected in the dual charging data transmit processor (d-CDTP) by a self-test of the dual charging data transmit processor (d-CDTP).

15. The method as claimed in claim 14, further comprising the step of causing the mobile switching center main processor status handler (MSC MPSH) to generate at least one of an alarm and a corresponding message to the mobile switching center (MSC) if the mobile switching center main processor status handler (MSC MPSH) receives the predetermined signal indicating the failure detected in the self-test from the dual charging data transmit processor (d-CDTP).

16. A method of maintaining and repairing an interface processor in a personal communication service exchange (PCX) system, comprising the steps of:

providing a mobile switching center (MSC) in the personal communication service exchange (PCX) system, the mobile switching center (MSC) including a mobile switching center main processor status handler (MSC MPSH) for status handling and control of an interface processor in the personal communication service exchange (PCX) system;

providing a charging data transmit processor (CDTP), the charging data transmit processor (CDTP) being an interface processor between the mobile switching center (MSC) and a processor in the personal communication service exchange (PCX) system;

periodically sending by the mobile switching center main processor status handler (MSC MPSH) a status handling signal to the charging data transmit processor (CDTP) by the interprocessor communication (IPC); and determining whether the mobile switching center main processor status handler (MSC MPSH) receives a response signal from the charging data transmit processor (CDTP) in response to the status handling signal, wherein if the response signal is received by the mobile switching center main processor status handler (MSC MPSH) the charging data transmit processor (CDTP) is in a normal state and if the response signal is not received by the mobile switching center main processor status handler (MSC MPSH) the charging data transmit processor (CDTP) is in an abnormal state.

17. The method as claimed in claim 16, further comprising the step of generating at least one of an alarm and a message indicating the abnormal state to the mobile switching center (MSC) if the charging data transmit processor (CDTP) is in the abnormal state.

18. An apparatus for maintaining and repairing an interface processor in a personal communication service exchange (PCX) system, comprising:

a mobile switching center (MSC), the mobile switching center (MSC) having a mobile switching center main processor status handler (MSC MPSH) for status handling and control of an interface processor in the personal communication service exchange (PCX) system, the mobile switching center main processor status handler (MSC MPSH) for periodically sending a status handling signal to the interface processor by interprocessor communication (IPC); and a charging data transmit processor (CDTP) as the interface processor, the charging data transmit processor (CDTP) for sending a response signal to the mobile switching center main processor status handler (MSC MPSH) in response to the status handling signal if the charging data transmit processor (CDTP) is in a normal state, wherein if the charging data transmit processor (CDTP) fails to send the response signal to the mobile switching center main processor status handler MSC MPSH) the charging data transmit processor (CDTP) is in an abnormal state.

19. The apparatus as claimed in claim 18, further comprising at least one of an alarm and a message indicator for indicating the abnormal state of the charging data transmit processor (CDTP).

* * * * *